(12) United States Patent
Mack (10) Patent No.: US 8,993,151 B2
(45) Date of Patent: Mar. 31, 2015

(54) BATTERY HAVING NON-PLANAR HEAT SEAL WITH EXTENDED CONTAINER WALLS AND RECESSED COVER WALLS

(71) Applicant: Johnson Controls Technology Company, Holland, MI (US)

(72) Inventor: Robert J. Mack, Milwaukee, WI (US)

(73) Assignee: Johnson Controls Technology Company, Holland, MI (US)

( * ) Notice: Subject to any disclaimer, the term of this patent is extended or adjusted under 35 U.S.C. 154(b) by 308 days.

(21) Appl. No.: 13/644,417

(22) Filed: Oct. 4, 2012

(65) Prior Publication Data

US 2013/0089775 A1    Apr. 11, 2013

Related U.S. Application Data

(60) Provisional application No. 61/544,176, filed on Oct. 6, 2011.

(51) Int. Cl.
*H01M 2/02* (2006.01)
*H01M 2/04* (2006.01)
(Continued)

(52) U.S. Cl.
CPC .......... *H01M 2/0242* (2013.01); *H01M 2/0404* (2013.01); *H01M 2/043* (2013.01); *H01M 2/0434* (2013.01); *H01M 2/0473* (2013.01);
(Continued)

(58) Field of Classification Search
CPC . H01M 2/0242; H01M 2/0404; H01M 2/043; H01M 2/0434; H01M 2/0473; H01M 4/20; H01M 4/57; H01M 4/73; H01M 10/06; H01M 2220/20

USPC ......... 429/158, 176, 175, 160, 161, 181, 186, 429/185, 163; 156/69; 264/334; 29/623.1
See application file for complete search history.

(56) References Cited

U.S. PATENT DOCUMENTS 2,480,964 A * 9/1949 Randall .......................... 429/160
3,900,343 A * 8/1975 Bergh et al. ................... 429/160
(Continued)

FOREIGN PATENT DOCUMENTS

DE       2360629 A1    6/1974
DE       3238485 A1    4/1984
(Continued)

OTHER PUBLICATIONS

International Search Report and Written Opinion of the International Searching Authority for PCT/US2012/058870 filed Oct. 5, 2012.
(Continued)

*Primary Examiner* — Kenneth Douyette
(74) *Attorney, Agent, or Firm* — Boardman & Clark LLP (57) ABSTRACT

A container for a battery is disclosed. The container includes first and second side walls coupled to end walls and a base forming a recess. The side walls and end walls each have an edge. A container intercell partition wall is provided in the recess and has a segment which extends above the edge of any one or more of the first side wall, second side wall, and end walls. A cover is also provided having a cover intercell partition wall with a recessed area which accommodates the extended segment of the container intercell partition wall. The cover intercell partition wall may be coupled to the container intercell partition wall by a heat seal. A method of assembling a battery container is also disclosed.

21 Claims, 9 Drawing Sheets

(51) Int. Cl.
   *H01M 4/20* (2006.01)
   *H01M 4/57* (2006.01)
   *H01M 4/73* (2006.01)
   *H01M 10/06* (2006.01)
(52) U.S. Cl.
   CPC . *H01M 4/20* (2013.01); *H01M 4/57* (2013.01);
      *H01M 4/73* (2013.01); *H01M 10/06* (2013.01);
      *H01M 2220/20* (2013.01)
   USPC .......................................... 429/176; 29/623.1

(56) References Cited

U.S. PATENT DOCUMENTS

| | | | |
|---|---|---|---|
| 4,642,442 A | 2/1987 | Mullane et al. | |
| 4,724,190 A | 2/1988 | Siga et al. | |
| 5,424,148 A | 6/1995 | Mrotek et al. | |
| 5,637,419 A | 6/1997 | Hooke et al. | |
| 6,468,318 B1 * | 10/2002 | Meadows et al. | 29/623.1 |
| 2006/0216595 A1 | 9/2006 | Holliday et al. | |

FOREIGN PATENT DOCUMENTS

| | | |
|---|---|---|
| EP | 0 589 549 B1 | 6/1999 |
| JP | 5121052 A | 5/1993 |

OTHER PUBLICATIONS

GS Yuasa Corporation, New Generation Valve Regulated Lead-acid Battery with Higher Performance and Higher Reliability for Motor Cycle-use, 2008, pp. 7-15, Japan.

* cited by examiner

BATTERY HAVING NON-PLANAR HEAT SEAL WITH EXTENDED CONTAINER WALLS AND RECESSED COVER WALLS

CROSS-REFERENCE TO RELATED APPLICATIONS

This application claims priority to U.S. Provisional Patent Application, Ser. No. 61/544,176, filed Oct. 6, 2011, entitled BATTERY, the contents of which are hereby incorporated herein by reference in its entirety.

FIELD

The present invention relates to the field of batteries (e.g., lead-acid batteries including batteries for vehicle starting, lighting and ignition applications; marine batteries; commercial batteries; industrial batteries; batteries for use with hybrid-electric vehicles, microhybrid vehicles, etc.). The present invention more specifically relates to the container or housing of a lead acid battery.

BACKGROUND

Secondary batteries, such as lead-acid batteries, are generally formed having a plastic or polypropylene container which houses battery plates and electrolyte that carry out the electrochemical reaction of the battery. A cover is mounted on the container at the upper edges. Many such batteries utilize containers with cell dividers or partitions which divide the container into several compartments. The compartments hold the battery plates or plate stacks. The partitions or cell dividers are generally formed of a rectangular shape and have an upper edge which is aligned, or co-terminus with, or below the upper edge of the container. In such battery assemblies, the height of the container wall and the partition wall determines the maximum height of the battery plate or grid. As a result, the size of the grid and corresponding performance of the grid is limited by the container height.

SUMMARY

Accordingly, a container for a battery is disclosed. The container has first and second side walls coupled to end walls and a base forming a recess. The side walls and end walls each have an edge. A plurality of intercell partition walls are provided in the recess having a segment which extends above the edge of any one or more of the first side wall, second side wall, and end walls. The plurality of intercell partition walls includes a first intercell partition wall having an extended segment which is different from extended segments of a plurality of second intercell partition walls.

An additional container for a battery is disclosed. The container has first and second side walls coupled to end walls and a base forming a recess. The side walls and end walls each have an edge. A container intercell partition wall is provided in the recess and has a segment which extends above the edge of any one or more of the first side wall, second side wall, and end walls. A cover is provided having a cover intercell partition wall with a recessed area which accommodates the extended segment of the container intercell partition wall and is coupled to the container intercell partition wall by a heat seal.

A method of assembling a battery container is also disclosed. The method includes forming a container having first and second side walls coupled to end walls and a base forming a recess, the side walls, and end walls each having an edge. The method also includes forming a container intercell partition wall in the recess having a segment which extends above the edge of any one or more of the first side wall, second side wall, and end walls, wherein the container intercell partition wall forms a compartment in the container. A cover is coupled to the container by heat sealing a cover intercell partition wall with a recessed area to the extended segment of the container intercell partition wall.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Figure 1:
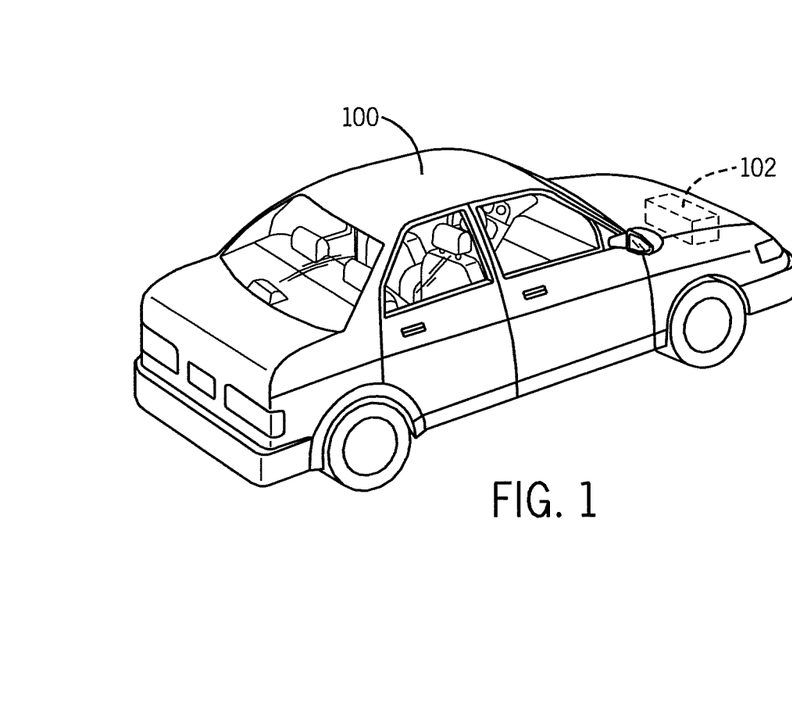
FIG. 1 is an isometric view of a vehicle including a battery according to one or more examples of embodiments.

Referring to FIG. 1, a vehicle 100 is shown that includes a battery 102 according to one or more examples of embodiments. While the vehicle 100 is shown as an automobile, according to various alternative embodiments, the vehicle may comprise any variety of types of vehicles including, among others, motorcycles, buses, recreational vehicles, boats, ATVs, golf cars and carts, and the like. According to one or more examples of embodiments, the vehicle 100 may use an internal combustion engine for locomotive purposes, or may be powered by battery or other in combination with other now known or future-developed means.

Figure 2:
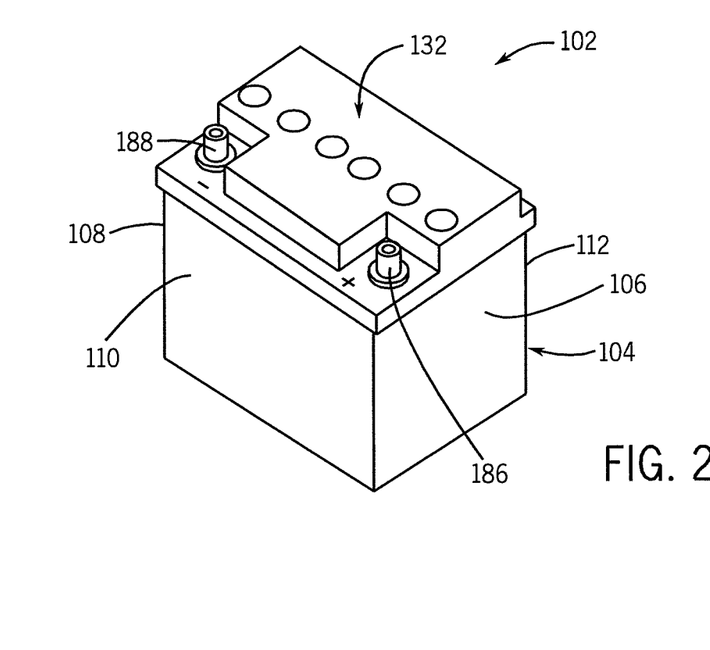
FIG. 2 is an isometric view of a battery according to one or more examples of embodiments.

The battery 102 shown in FIG. 2 is configured to provide at least a portion of the power required to start and/or operate the vehicle 100 and/or various vehicle systems (e.g., starting, lighting, and ignition systems). Further, it should be understood that the battery 102 may be utilized in a variety of applications not involving a vehicle, and all such applications are intended to be within the scope of the present disclosure.

The battery 102 shown in FIG. 2 may include any type of secondary battery (e.g., rechargeable battery). According to one or more examples of embodiments, the battery 102 includes a lead-acid storage battery. Various examples of embodiments of lead-acid storage batteries may be either sealed (e.g., non-maintenance) or unsealed (e.g., wet), and in one or more particular examples, is a sealed lead-acid battery. In one or more examples of embodiments, the battery is a DIN (Deutsches Institut für Normung) standard battery.

A lead-acid storage battery 102 according to one or more examples of embodiments is illustrated in FIG. 2. The battery 102 has a housing or container 104 which contains or carries many of the operative elements and devices of the battery.

Referring to FIGS. 3-6, in various examples of embodiments, the battery housing is a box-like base or container 104. The housing or compartment or container 104 has one or more end walls 106, 108 (e.g., a front wall and/or a rear wall) coupled to one or more side walls 110, 112. The end walls 106, 108 and side walls 110, 112 are also coupled to a base 114 which, when combined, form a recess 116. The side walls 110, 112 and end walls 106, 108 each have an edge 118 opposite the base 114. In the recess 116, one or more partitions 122 or dividers are provided, for example between the walls, resulting in the formation of compartments 120. One particular example is a container 104 having five cell partitions forming six compartments, as may be present in a twelve-volt automotive battery. The partitions 122 or dividers may extend from an inner edge, which is in contact with or coupled to the base 114, to an outer edge 126. The partitions 122 or dividers may also extend from sidewall 110 to sidewall 112. One or more intercell partition walls 122, and in the illustrated embodiment a plurality of intercell partition walls, are provided in the recess 116 and have a segment 124 which extends above the edge 118 of any one or more of the first side wall 110, second side wall 112, and end walls 106, 108. The segment 124 may extend to and include the outer edge 126 of the partition walls. That is, in one or more examples of embodiments, the extended segment 124 and outer edge 126 extend above the plane formed by the outer edge 118 of the side walls 110, 112 and end walls 106, 108. The extended segment 124 may be arranged to extend beyond a cast-on-strap 128 of a plate assembly 130 received within the container 104 and provide clearance between the cast-on-strap and a cover 132.

Figure 3:
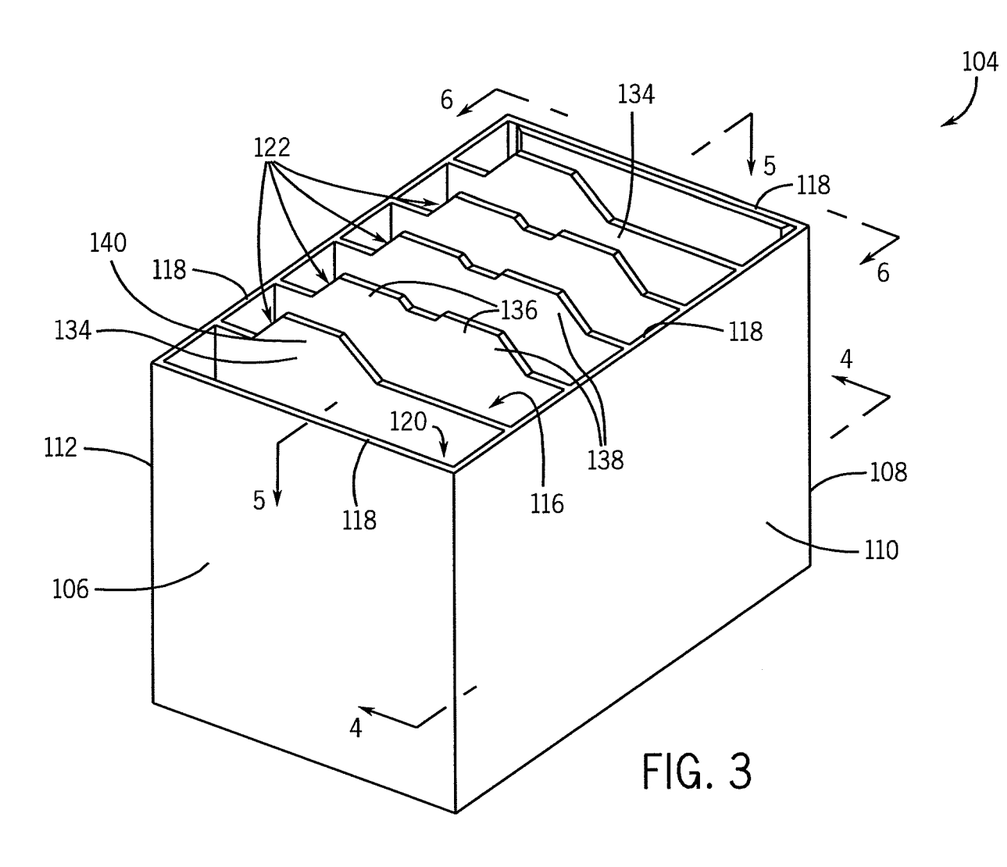
FIG. 3 is an isometric view of a battery container according to one or more examples of embodiments.
Figure 4:
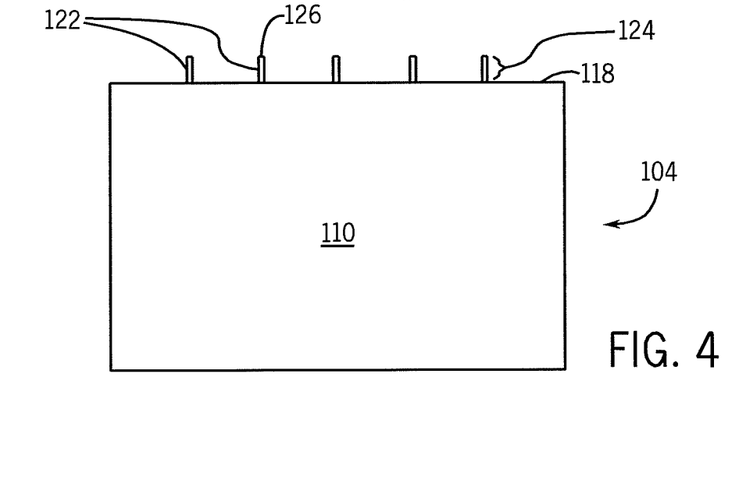
FIG. 4 is a side elevation view of the battery container shown in FIG. 3, taken from line 4-4 of FIG. 3.
Figure 5:
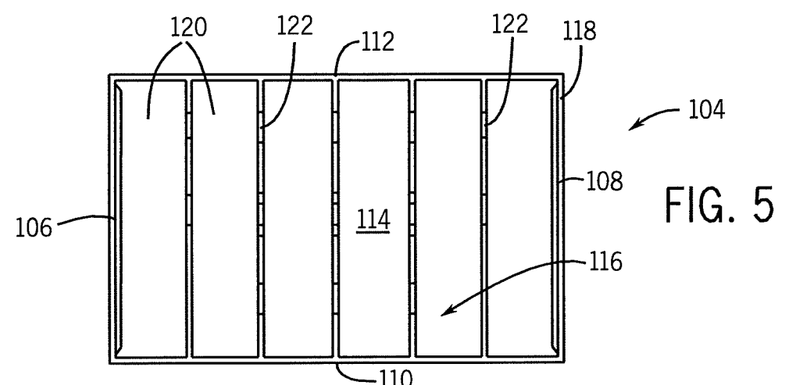
FIG. 5 is a top plan view of the battery container shown in FIG. 3, taken from line 5-5 of FIG. 3.
Figure 6:
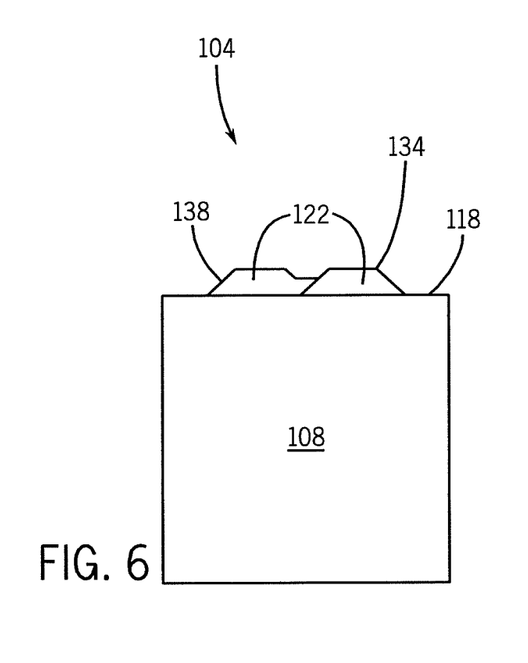
FIG. 6 is an end elevation view of the battery container shown in FIG. 3, taken from line 6-6 of FIG. 3.

The plurality of intercell partition walls 122 may include a first intercell partition wall 134 including an extended segment 124 which is different from extended segments 136 of a plurality of second intercell partition walls 138. As shown in FIG. 3, a pair of intercell partition walls 134 may be provided with extended segments 140 which are different from extended segments 136 of the plurality of second intercell partition walls 138. In FIG. 3, the first intercell partition wall 134, or the pair of intercell partition walls, includes a single raised segment 140, whereas the second intercell partition walls 138 include more than one raised segment (e.g., 136). In the alternative, the first partition wall, or pair of intercell partition walls, may have a narrower raised segment, or alternatively positioned raised segment, than the raised segment of the second intercell partition walls. In the illustrated example, the first intercell partition wall 134 is also adjacent to an end wall 106 or 108 of the container 104.

The partition, or partition wall or intercell wall 122, in one or more examples of embodiments, is extended beyond or raised above the edge 118 of, or height of, one or more of the end walls 106, 108 and/or side walls 110, 112. In the illustrated example, each of the end walls 106, 108 and side walls 110, 112 are co-terminus such that their edges 118 are aligned in the same plane. Accordingly, one or more intercell partition walls 122 extend out of the recess 116 of the container 104 and beyond the plane formed by the edges 118.

Figure 10:
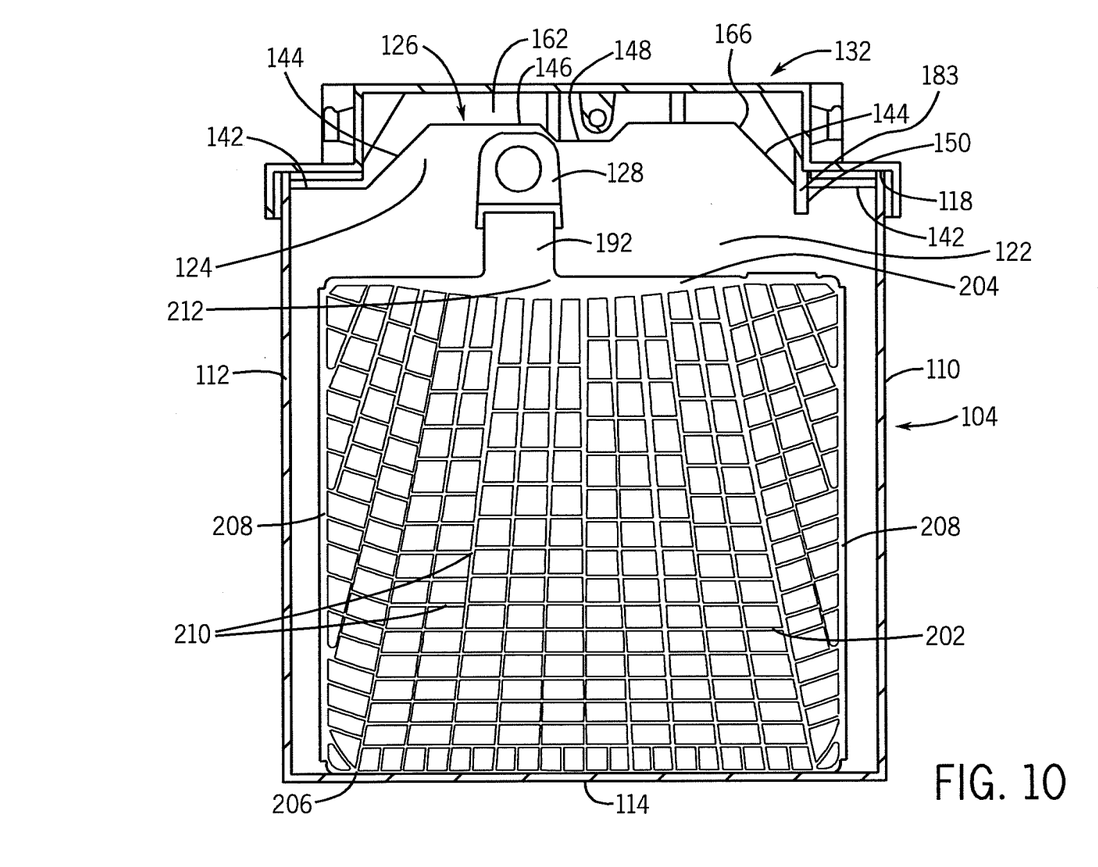
FIG. 10 is a sectional view of a battery shown in FIG. 2 according to one or more examples of embodiments, showing a full coupling of the cover and the container.

Each extended intercell partition wall 122 may be configured and/or provided anywhere along the side walls 110, 112 or end walls 106, 108. In one or more examples of embodiments, a portion of the intercell partition wall may be raised to accommodate the cast-on-strap 128 on the lug and provide clearance with the cover 132. Further, for various reasons including those identified herein, one or more partition walls may include a plurality of extended partition portions. More specifically, the intercell partition wall 122 may further have a portion or segment configured to have one or more planar or substantially planar distal edges 142 coupled to upwardly extending or angled edge sections 144, which angled edge sections may be joined by parallel or substantially parallel edge sections 146 (parallel to said planar distal edges 142). In the illustrated example, the intercell partition wall includes one or more recessed segments, or areas of clearance, or interruptions 148 in the parallel edge section 146 to accommodate features carried by the cover 132, such as but not limited to a vent and/or a terminal bushing. In the example shown in FIG. 3, the distal edge 142 of one or more of the extended partition portions may be substantially straight. Alternatively, as shown in FIG. 10, the distal edge 142 may include or define at least one notch 150 or offset adapted to accommodate the cover 132 or a component thereof or as desired (e.g., to help allow gases to travel between cells formed by the partition).

Referring to FIGS. 2 and 7-12, a cover 132 is provided for the housing 104. In the examples shown in FIGS. 7-8, the cover 132 includes one or more end walls 152, 154 (e.g., a front wall and/or a rear wall), one or more side walls 156, 158, and a top 160. The cover 132 also includes one or more intercell partition walls 162 or dividers in contact with the top 160 and at least partially extending from the top toward the outer edge 164 of the side walls 156, 158 and/or end walls 152, 154. The intercell partition walls 162 may also extend from side wall 156 to side wall 158. In the illustrated example, a plurality of intercell partition walls 162 are provided. For instance, five recessed walls, partitions or dividers extending from top may be provided between the end walls, resulting in the formation of six compartments, generally corresponding to six compartments present in a container of a twelve-volt automotive battery when the cover is coupled to the container.

In various examples of embodiments, and as shown in FIGS. 7-12, the cover 132 has an intercell partition wall 162 with a recessed area 166 which accommodates an extended segment 124 of the intercell partition wall 122 of the container 104. The shape and configuration of one or more extended partition portions 122 of the container 104 may be adapted to substantially meet recessed intercell partition walls 162 in a cover 132 for the battery 102. To this end, the intercell partition wall 162 of the cover 132 may be aligned with the intercell partition wall 122 of the container 104, or a plurality of intercell partition walls 162 in the cover with a recessed area 166 may be provided to accommodate, and more specifically arranged and/or shaped to align with, the plurality of container intercell partition walls 122 with extended segments 124. One or more capture elements 183 may be provided on one or both sides of one or more partition walls to facilitate the alignment of the cover partition wall with the container partition wall. In the illustrated examples, the capture elements 183 are carried on opposing sides of the cover intercell partition wall, but variations thereon would not depart from the overall scope of the present invention.

Figure 7:
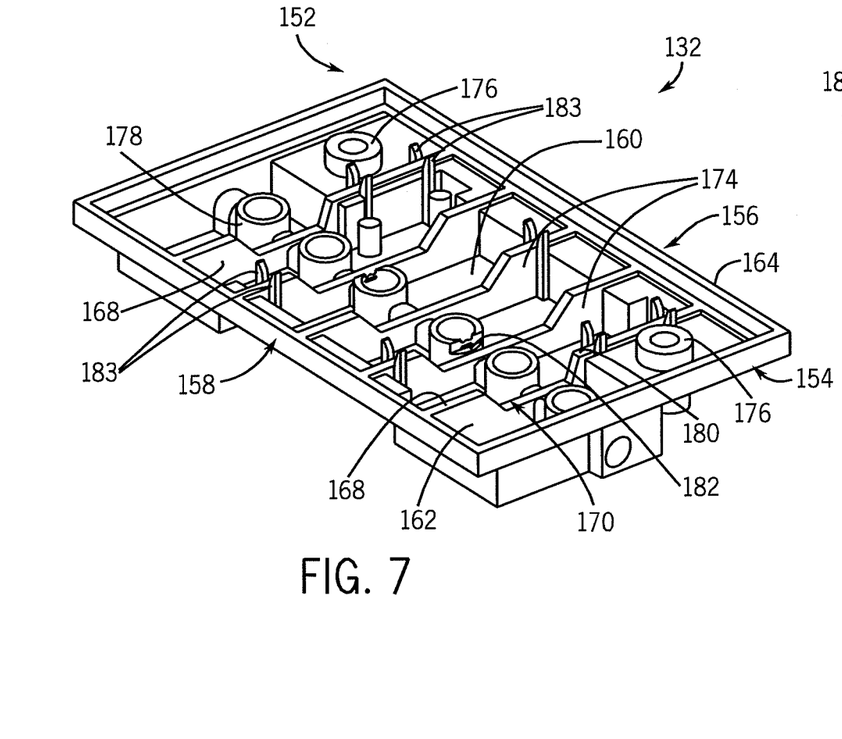
FIG. 7 is a bottom isometric view of a battery cover for use with a battery as shown in FIG. 2 and a container as shown in FIG. 3 according to one or more examples of embodiments.
Figure 8:
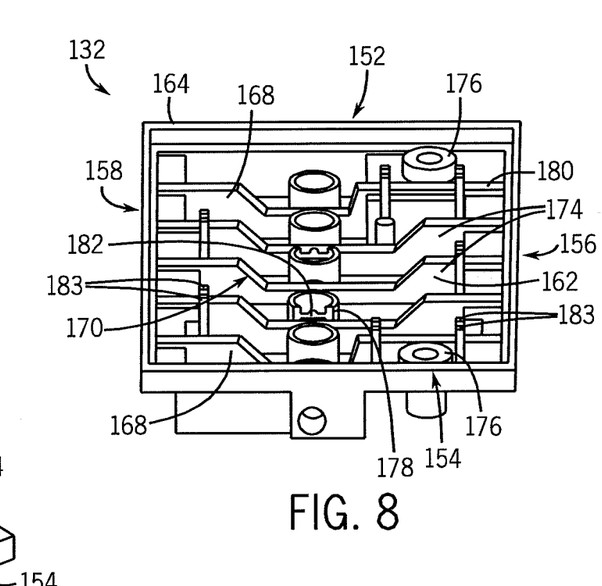
FIG. 8 is a bottom isometric view of the battery cover shown in FIG. 7.

The cover 132 having recessed intercell partition walls 162 may be provided with the same pattern of intercell partition walls and corresponding recesses as the container 104 and extended or raised intercell partition walls 122. To this end, the plurality of intercell partition walls 162 of the cover 132 may include a first cover intercell partition wall 168 which includes a recessed segment 170 which is different from a recessed segment 172 of a second cover intercell partition wall 174, or plurality of second cover intercell partition walls. In the illustrated example, the plurality of second intercell partition walls 174 are provided adjacent to each other, and a pair of first cover intercell partition walls 168 are provided and/or arranged adjacent the end walls 152, 154 of the cover 132.

In various examples of embodiments, the cover 132 includes terminal bushings 176. To help permit exhausting of gases generated during the electrochemical reaction, a battery may also include one or more vent cap assemblies 178. Filling areas or holes may also be provided. Accordingly, the cover intercell partition walls 162 may be provided with segments accommodating features carried by the cover 132 or included in the battery container 104. For instance, the intercell partition wall 162 may have a segment 180 arranged to accommodate a battery terminal or terminal bushing 176, and/or an area or segment 182 arranged to accommodate a cover vent cap 178, and the like.

While in the foregoing description and in the illustrated embodiments, one or more particular shapes and locations of partition wall 122 and 162 are particularly described, such shape may depend upon and thus vary based upon a variety of considerations including, without limitation, the configuration of the cover 132, the location and/or configuration of one or more components provided on or in connection with the cover, the height of the plate or grids in the cells formed at least in part by the partition wall 122 and 162, and/or the configuration and location of the one or more cast-on-straps 128 coupled or to be coupled on or through the partition. It should also be noted that, in other embodiments, a different number of compartments 120 may be provided. Moreover, while the compartments 120 are shown as having a generally rectangular shape, other shapes may be used (e.g., generally cylindrical or curved or polygonal) according other examples of embodiments. Likewise, while the intercell partition walls 122, 162 are described and illustrated in a corresponding pattern, it is contemplated that the intercell partition walls 122, 162 of the container 104 and the cover 132 may have a varied pattern depending upon the desired manufacturing and end uses.

In the battery assembly, the cover 132 is coupled to container 104. In various examples of embodiments, the cover 132 is at least partially heat-sealed to the container 104 (e.g., at various points). To this end, the partitions or intercell partition walls 122 may be partially or fully coupled or joined to the recessed intercell walls 162 in the cover 132. As shown in FIG. 10, the container intercell partition wall 122 and cover intercell partition wall 162 are coupled in their entirety. In other words, the intercell partition walls 122, 162 are joined at their edges along their width or length from side wall to side wall.

Figure 11:
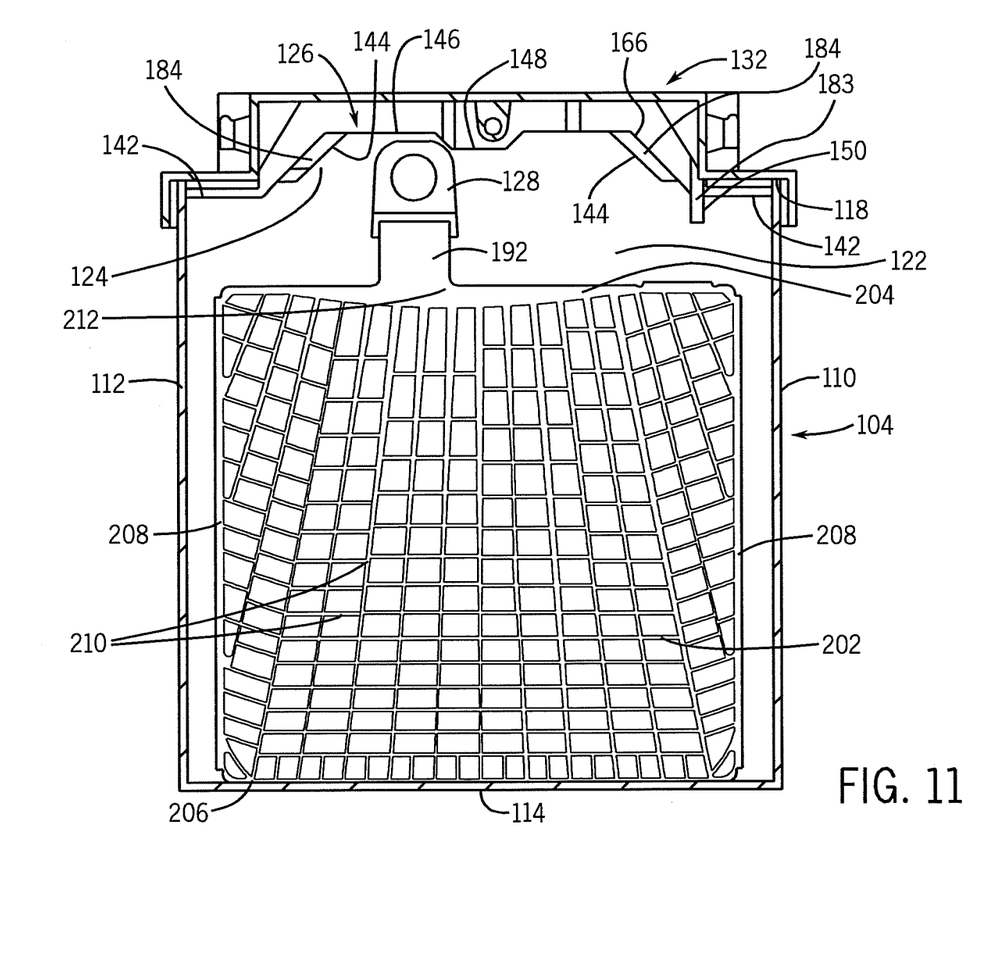
FIG. 11 is a sectional view of a battery shown in FIG. 2 according to one or more examples of embodiments, showing a partial coupling of the cover and the container.

However, in various examples of embodiments the container intercell partition wall 122 and the cover intercell partition wall 162 are partially coupled, and an area of clearance 184 between the container intercell partition wall 122 and the cover intercell partition wall 162 is provided. For instance, as shown in FIG. 11, one or more extended partition portions may be adapted to only partially correspond and couple to the recessed intercell walls in the cover 132 such that clearance or head space 184 may be provided, and in one example gases may travel between cells formed by the partitions and corresponding recessed intercell walls.

Figure 12:
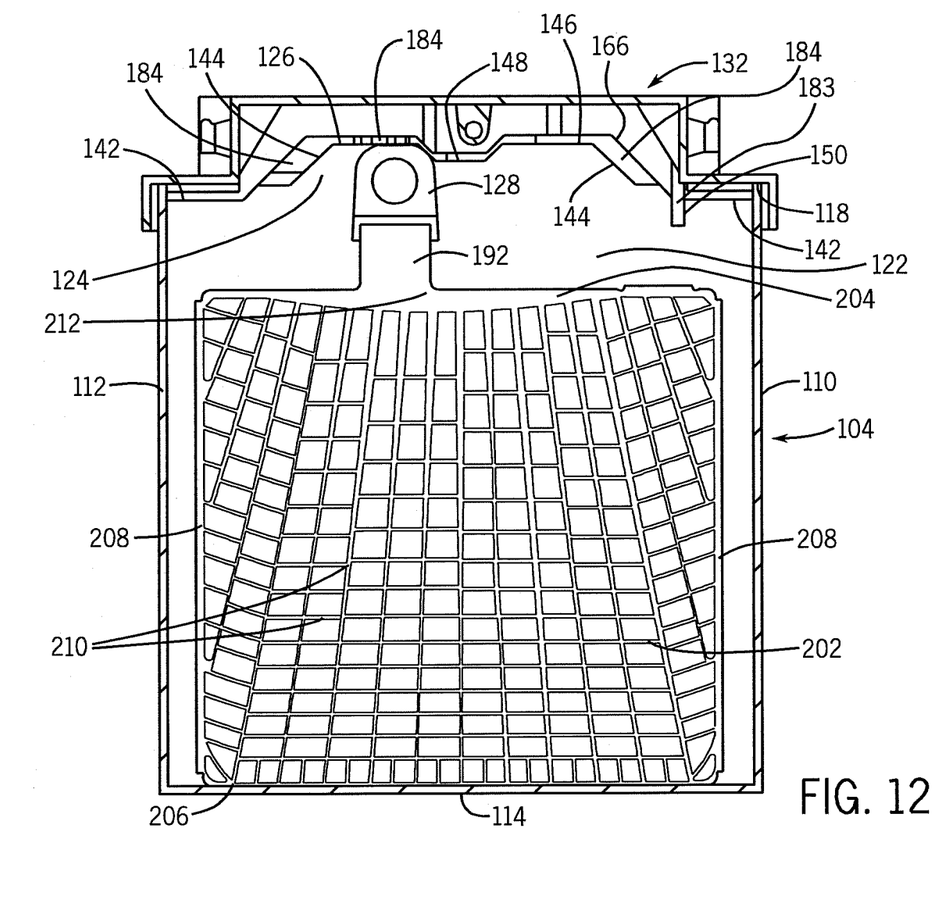
FIG. 12 is a sectional view of a battery shown in FIG. 2 according to one or more examples of embodiments, showing a edge only coupling of the cover and the container.

In one further example of embodiments, as shown in FIG. 12, the container intercell partition wall 122 and the cover intercell partition wall 162 are partially coupled at edge portions 142 of the partition walls adjacent the side walls 110, 112 of the container 104, and an area of clearance 184 (larger than the area of clearance shown in FIG. 11) is provided which is defined between the intercell partition wall of the container 104, the intercell partition wall of the cover 132, and the edge portions 142.

According to one or more examples of embodiments, the container 104 is coupled to the cover 132 by heat seal. In particular, the extended segment 124 of the container intercell partition wall 122 is coupled to the cover intercell partition wall 162 by a heat seal. Therefore, a cover 132 having an intercell partition wall 162 with a recessed area 166 may be coupled in its entirety to the extended segment 124 of an intercell partition wall 122 of the container 104 by a heat seal. In the alternative, a cover 132 having an intercell partition wall 162 with a recessed area 166 may be partially coupled to the extended segment 124 of an intercell partition wall 122 of the container 104 by a heat seal and includes an area of clearance 184 between the intercell partition wall of the container 104 and the intercell partition wall of the cover 132. In a further alternative, the cover 132 having an intercell partition wall 162 with a recessed area 166 may be partially coupled to the extended segment 124 of an intercell partition wall 122 of the container 104 by a heat seal at edge portions 142 adjacent the side walls 110, 112 of the container 104 and includes an area of clearance 184 defined between the intercell partition wall of the container 104, the intercell partition wall of the cover 132, and the edge portions 142.

While heat seal is specifically described, it is contemplated that the cover 132 and container 104 may be joined by other means, including but not limited to by adhesive, ultrasonic welding, plastic welding, induction sealing, and other now known or future-developed processes.

The battery 102 defined or including the container 104 and cover 132 described herein includes a positive terminal 186 and a negative terminal 188 (see FIG. 2). The positive and negative terminals 186, 188 may be found on or about the top 160 or a side wall 110, 112 or end wall 106, 108 (e.g., front wall) of the battery 102. Such terminals 186, 188 typically include portions which may extend through the cover 132 and/or the wall of the battery housing 104, depending upon the battery design. In various examples of embodiments, terminal posts extend through a terminal post seal assembly to help prevent leakage of acid. It will be recognized that a variety of terminal arrangements are possible, including top, side or corner configurations known in the art.

Figure 9:
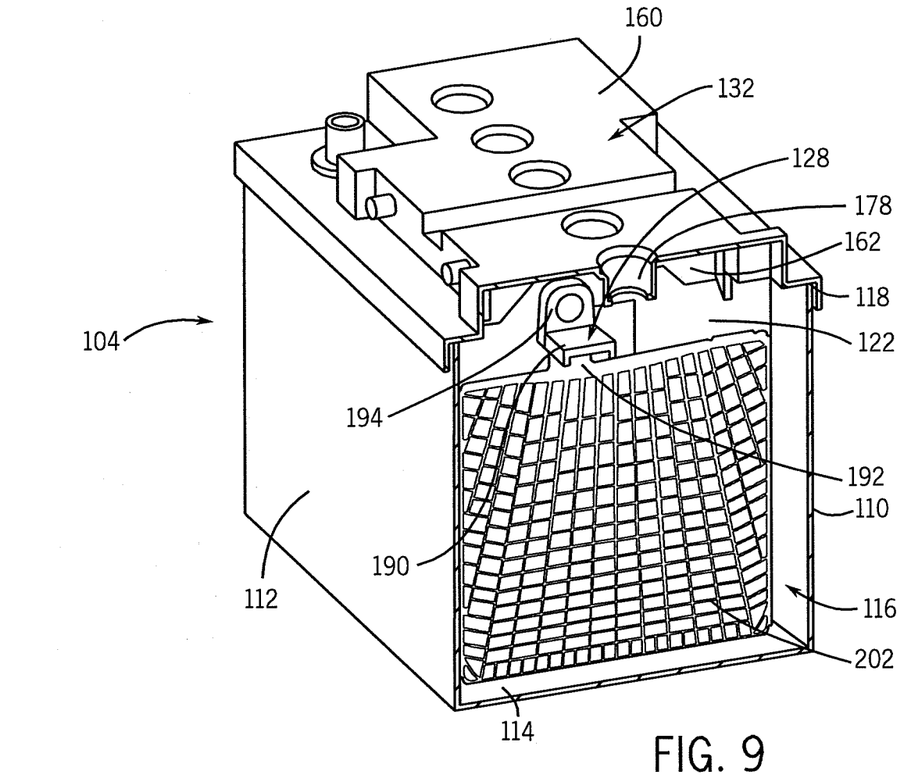
FIG. 9 is a cut-away isometric view of a battery as shown in FIG. 2 according to one or more examples of embodiments.
Figure 13:
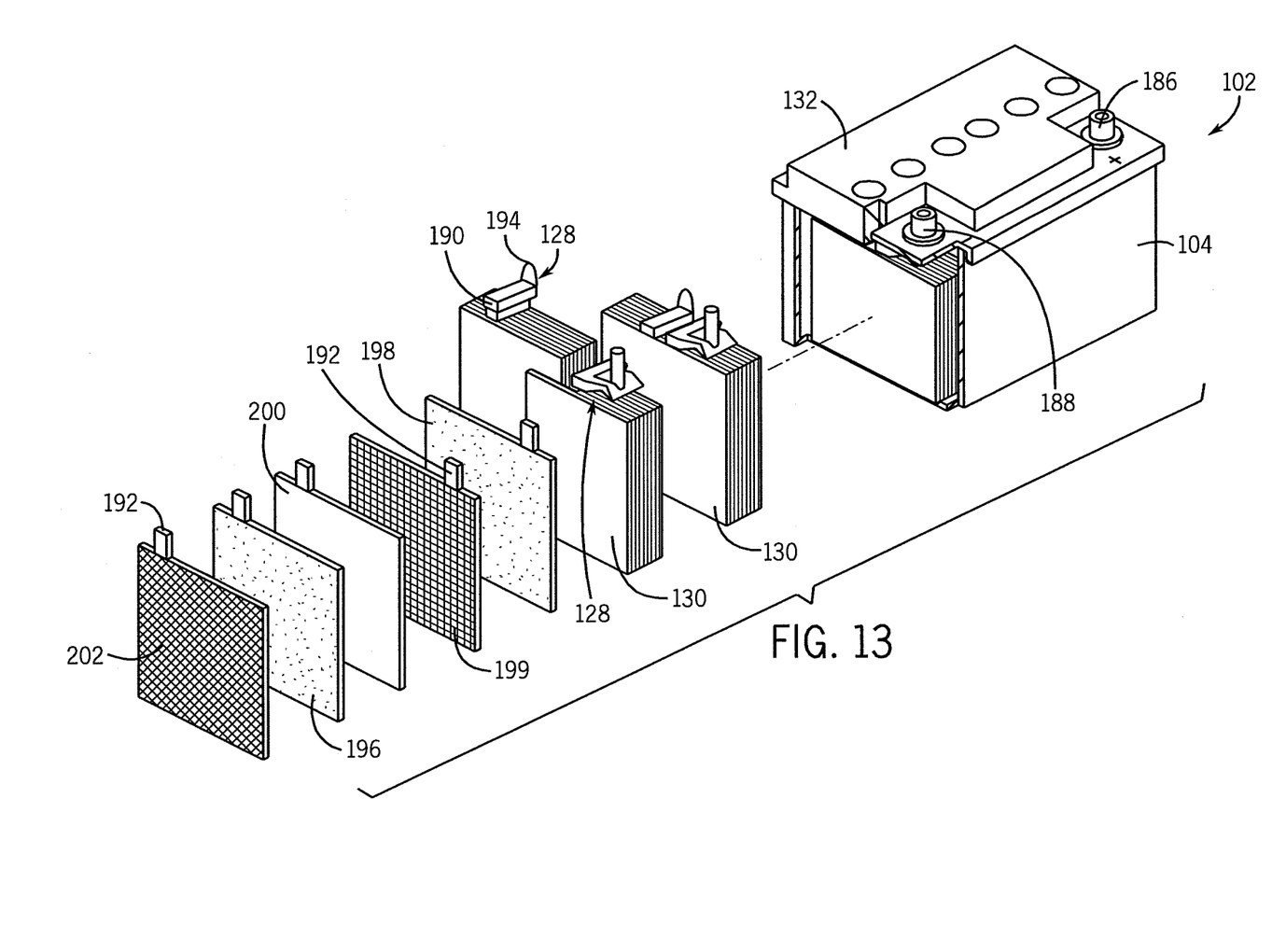
FIG. 13 is a partial cut away, exploded isometric view of the battery shown in FIG. 2.

Referring generally to FIG. 13, the terminal posts 186, 188 are coupled to cast-on-straps 128 which couple together positive lugs of battery plates and couple together negative lugs of battery plates. Cast-on-straps 128 of one cell or stack 130 are coupled with the appropriate cast-on-straps of an adjacent stack. FIGS. 9-10 show one or more examples of a cast-on-strap 128. Cast-on-straps 128 may include an elongate body portion 190 having a length sufficient to couple lugs 192 in a row of a battery plate cell or stack 130. In various examples of embodiments, cast-on-straps 128 also include a portion extending away from the elongate body portion, such as for example a vertically extending portion 194. FIGS. 9-10 illustrate a cast-on-strap 128 in the form of a "tombstone." In the illustrated example, the cast-on-strap 128 has a rounded top similar to a "tombstone" at one end of the elongate body portion. The rounded top(s) may provide additional support and area to which the straps and the partitions may be secured thereagainst. While a tombstone-type cast-on-strap 128 is illustrated for purposes of example, it should be appreciated that other variations of cast-on-straps and welds (e.g., oval welds) may be used.

As indicated, the cast-on-strap(s) 128 couple together lugs 192 of battery plates. The collection of battery plates which are coupled together form a cell element or plate stack or chapter 130. Each cell element or chapter includes one or more positive plates 196, one or more negative plates 198, and a separator 200 positioned between each positive and negative plate. Separators 200 are provided between the plates to prevent shorting and/or undesirable electron flow produced during the reaction occurring in the battery 102.

Positive and negative electrode plates 196, 198 can be classified into various types according to the method of manufacturing the same. As one example, a paste-type electrode includes a grid substrate and an electrochemically active material or "paste" provided on the substrate. In one or more examples of embodiments, as shown in FIG. 13, each plate 196, 198 has a generally rectangular shape and includes a lug 192 which, as described, is electrically coupled to a battery terminal 186 or 188 using a cast-on strap 128. The plate also may include side walls, a bottom edge, and opposing faces.

In a lead-acid battery 102, the positive and negative plates 196, 198 each comprise a lead or lead alloy grid 202 that serves as a substrate and supports an electrochemically active material deposited or otherwise provided thereon during manufacture to form battery plates. The grid 202 may be formed of a soft alloy. The grids 202 provide an electrical contact between the positive and negative active materials or paste which serves to conduct current.

In one or more examples of embodiments, a grid 202 includes a top frame element 204 and a bottom frame element 206 (see FIG. 10). In some examples of embodiments, the grid 202 may also include side frame elements 208. The grid 202 includes a series of grid wires 110 defining open areas that help hold the active material or paste which helps provide current generation. In various examples of embodiments, the current collection lug 192 is integral with the top frame element 204, and may be offset from the center of the top frame element. However, the lug 192 may alternatively be centered or positioned closer to either the first or second side frame elements 208. The top frame element 204 may also optionally include an enlarged conductive section 212 at least a portion of which is directly beneath the lug 192 to optimize current conduction to the lug. The bottom frame element 206 may optionally include one or more downwardly extending feet (not shown) for spacing the remainder of the grid 202 away from the bottom of the battery container 104.

It should be noted that an infinite number of grid 202 (or 199) designs may be utilized and therefore, it is not the intent of this description to limit the invention to any particular grid designs, which are presented for the purposes of illustration. Lead acid battery grid-making processes include, but are not limited to: (1) batch processes such as book mold gravity casting; and (2) continuous processes such as strip expansion, strip stamping, continuous casting, and continuous casting followed by rolling. Grids 202 made from these processes may have unique features characteristic of the particular process and behave differently in lead acid batteries, especially with respect to the pasting process. It should be appreciated that grids formed from any conventional or later-developed grid manufacturing process may be utilized for the desired manufacturing and/or battery output purposes.

The active material or paste may be a lead-based material (e.g., $PbO$, $PbO_2$, $Pb$ or $PbSO_4$ at different charge/discharge stages of the battery) that is pasted, deposited or otherwise provided onto the grids 202. The paste composition may be determined by power requirements, cost and battery environment, as it is known in the art. The active material or paste provided on the negative grid is similar in type to the active material provided on the positive grid. However, there may be differences in the active material depending upon the polarity of the grids for which it is intended to be provided. The active material provided on the positive grid (e.g., lead dioxide [$PbO_2$]), may be provided in microparticle form, so that the electrolyte is allowed to diffuse and permeate through the lead dioxide microparticles on the positive electrode plate 196. The spongy lead, the active material of the negative electrode plate 198, may be porous and reactive, so that the electrolyte is allowed to diffuse and permeate through the sponge lead on the negative electrode plate.

To prevent the separation of the active materials from the grids 202 and to ensure easy handling of the active materials in the manufacture of electrodes, a pasting paper (not shown) may be adhered or otherwise provided on at least one of the surfaces of the active material as a support to the active material after deposition on the grids. Porous nonwoven fabric (e.g., having micron-sized pores), instead of paper, may alternatively be provided into the surface or on the active material to prevent the separation and handling problems of the active material and initial high rate discharge degradation. For example, a nonwoven fabric synthesized from thermoplastic resin by spun-bonding or thermal-bonding may be used. In various examples of embodiments, nonwoven fabric formed of one or more polyesters, polypropylenes, or viscose rayon is used.

In one or more examples of embodiments, one or more battery separators 200 (see FIG. 13) are used to conductively separate the positive and negative electrodes 196, 198. In one or more examples of embodiments, a separator material, utilized to separate adjacent plates from one another, has sufficient porosity and retention to contain at least substantially all of the electrolyte necessary to support the electrochemical reactions. In various examples of embodiments, the separator material is compressible so that upon stacking of the elements, the separator material substantially conforms to the contour of the surface of the plates to help it perform its wicking or capillary action.

In various examples of embodiments, as shown in FIG. 13, a cell or plate block 130 is located in each compartment 120. Each plate block 130 includes one or more positive and negative plates 196, 198, each having at least one lug 192, and separator material 200 placed between each positive and negative plate. A plurality of plate blocks 130 are connected in series according to the capacity of the storage battery 102 and are accommodated in the battery container 104 or housing together with the electrolyte, which is most commonly aqueous sulfuric acid.

In each cell, in various examples of embodiments, there may be essentially no free electrolyte except that retained within the separator material 200 or in any pores of the plates 196, 198. In various examples of embodiments, the separator material 200 surrounds an edge (e.g., the edge formed in part by the lower frame) of one or more plates 196, 198 and contacts at least one interior surface of the container 104.

In one or more examples of embodiments, the separator 200 may be similar in design and/or construction to that previously used for sealed lead-acid batteries operating on the oxygen recombination principle, in particular separators of a highly porous mat of ultrafine glass fibers. For example, in various examples of embodiments, the separator is constructed of absorbent glass mat (AGM). In various examples of embodiments, the non-woven mat includes a polymeric component such as polypropylene and/or polyethylene. In various examples of embodiments, the AGM is a non-woven fabric including glass micro-fibers that are intended to retain electrolyte (e.g., by capillary action) but also provide gas spaces as long as the grid is not fully saturated with electrolyte. The electrolyte is still free to move but is more confined than in a flooded cell. Other known and later developed separator materials may also or alternatively be used in connection with the cell including, without limitation, microporous rubber, polyvinyl chloride, polyolefin and phenolic resin impregnated paper.

Alternatively, the separator 200 may be similar in design and construction as that used in a flooded cell. For example, a ribbed separator constructed of a microporous sheet comprised of high molecular weight polyolefin may envelope grids 202 of a similar polarity (e.g., positive grids).

Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 1999, both of which are incorporated herein by reference.

A plate 196 or 198 for a lead-acid battery 102 is conventionally made by applying active material or paste to a conductive support such as a lead alloy grid 202 (or 199). Plates can be classified according to the method of manufacturing plates, or more specifically the grids. For example, the grids 202 may be produced using various known or later-developed processes. As discussed above, the substrate may be formed by a casting process (e.g., by pouring a melted alloy into a mold), a stamping process, or by continuous rolling. It is contemplated that any such plate and/or grid may be used with the present assembly.

The active material or paste is then applied to or otherwise provided (e.g., pasted by a conventional paster) on the grid 202. The paste is normally applied such that paste may be provided on substantially all of the grid 202, including the edges or margins, filling the holes therein as well as forming a coat on each face or side. Alternatively, the marginal edges and the lugs 192 are substantially free from paste. In various examples of embodiments, the active material of a lead-acid battery 102 is prepared by mixing lead oxide, sulfuric acid, and water. The lead oxide reacts with the sulfuric acid to form mono-, tri- and/or tetrabasic lead sulfate(s). Dry additives, such as fiber and expander, may also be added to the active material. For example, in various examples of embodiments, expanders such as finely divided carbons (e.g., lampblack or carbon black), barium sulfate, and various lignins may be included in the active material. In various examples of embodiments, the mixture is then dried and water is re-added to form a paste of the desired consistency.

In various examples of embodiments, one or more pasting materials or pasting papers (not shown) are provided on one or both surfaces of the active material. In various examples of embodiments, the pasting materials or paper may be provided in a continuous process.

In various examples of embodiments, the grids, active material, and pasting material or paper are fed to a divider where the strip is cut into plates 196 or 198. Plates cut from the strip may be flattened or otherwise modified to help smooth out any uneven regions of paste. In various examples of embodiments, the plates 196, 198 pass (e.g., on a conveyor) through an oven for flash-drying, and may then be stacked for later use. Conventionally, flash-drying may be performed using an open gas flame or an oven (e.g., as a 10-15 second drying of the plates in a conventional blast drying oven at about 260 deg C. (about 500 deg F.)). After drying, the battery plates 196, 198 undergo a chemical treatment, well known to those skilled in the art. The pasted plates are next typically cured for many hours under elevated temperature and humidity to help oxidize any free lead and otherwise adjust the crystal structure of the plate.

After curing, the plates 196, 198 are assembled into batteries 102. Groupings of individual battery plates may be assembled, enveloped, interleaved or otherwise separated with separator material 200, and provided together to form plate sets 130. For example, in one common battery design, unformed plates are assembled with interleaved highly absorbent separators, pressed to a desired pressure, if necessary, and inserted into the container 104 with the plates 196, 198 and separators 200 existing under mutual compression. In various examples of embodiments, AGM material 200 is wrapped around a plate. For example, the AGM material may be wrapped around the bottom edge of each positive plate 196 and extend upwardly along the opposing plate faces of each positive plate towards the lugs 192.

During assembly, the positive lugs of the battery plates are coupled together and the negative lugs of the battery plates (which plates are formed from negative grids 199 and paste) are coupled together. The lugs 192 may be coupled by cast-on-straps 128 formed by taking assembled battery stacks 130, inverting them, and dipping the lugs into molten lead provided in a mold. Moreover, terminal electrodes 186, 188 are provided which extend through the cover 132 or casing or into bushings or the like in the cover or casing to permit electrical contact with a vehicle's electrical system or other system requiring or intending to use battery power.

In various examples of embodiments, the battery housing 104 is provided containing the battery cells 130. The container 104 and/or cover 132 may be made of a moldable resin. The battery housing 104, including the intercell partition walls 122, may be formed by any now known or future-developed process, including but not limited to, for example, by mold or by separately forming the container and intercell partition walls which are subsequently joined. Once the compartments 120 are formed by the addition of one or more intercell partition walls 122, or formed by, for example, injection molding a formed battery container 104, the battery cells or plate stacks are placed in the compartment.

To permit current to flow throughout the battery 102, in various examples of embodiments, cast-on straps 128 of stacks 130 are joined or coupled (e.g., by welding) through the intercell partition wall or walls 122. Such coupling may be accomplished using weld jaws which extend downwardly over the tombstones of cast-on-straps 128 to be coupled, and which are clamped together to perform the welding operation.

The cover 132 is formed, similar to the container 104, by any now known or future-developed process which may include, but is not limited to, molding or separately forming the cover 132 and cover intercell partition walls 162 which are subsequently joined. The formed cover 132 is placed on the container 104 and may be coupled thereto. In one or more examples of embodiments, the cover 132 is placed upon the container 104 so as to align the intercell partition walls 122 of the container with the intercell partition walls 162 of the cover.

The partition walls 122 of the container 104 in one or more examples of embodiments are coupled to the partition walls 162 of the cover 132, examples of which are shown in FIGS. 11-13. The container partition walls 122 and cover partition walls 162 may be formed of similar or varying type material, and said partition walls may be coupled by heat seal. For instance, the plastic or polymer material of the respective partition wall(s) is heated so as to fuse, join, melt, seal, or otherwise secure the partition wall of the container 104 to the partition wall of the cover 132. Heat sealing can join two similar materials together or can join dissimilar materials, one of which has a thermoplastic layer.

As shown in FIGS. 10-12, the entire edge 126 of the container partition wall and the cover partition wall may be joined together (FIG. 10), or portions or segments thereof may be joined (FIG. 11), or only the edges, e.g., distal edges 142, of the partition walls may be joined (FIG. 12), depending upon manufacturing purposes or desired end use, to allow variations in head space in the sealed container.

Accordingly, a method of assembling a battery container 104 is provided which includes forming a container having first and second side walls 110, 112 coupled to end walls 106, 108, and a base 114 forming a recess 116, the side walls and end walls each having an edge 118. A container intercell partition wall 122 is formed or provided in the recess 116 and has a segment which extends above the edge 118 of any one or more of the first side wall, second side wall, and end walls. As a result, the container intercell partition wall 122 forms a compartment 120 in the container 104 which may receive a battery cell element 130 and/or electrolyte. A cover 132 is coupled to the container 104, and may be coupled, in one example, by heat sealing a cover intercell partition wall 162 with a recessed area 166 to the extended segment 124 of the container intercell partition wall.

While heat seal is specifically described, it is contemplated that the cover 132 and container 104 may be joined by other means, including but not limited to by adhesive, ultrasonic welding, plastic welding, induction sealing, and other now known or future-developed processes.

In various examples of embodiments, electrolyte is added to the battery container 104 with plates electrically coupled and contained therein. Any residual electrolyte fluid coating, dust, and other debris may be washed away to prepare the battery 102 for shipment.

Following the initial wash, the batteries are electrochemically formed by passage of current to convert the lead sulfate or basic lead sulfate(s) to lead dioxide (positive plates) or lead (negative plates). This is referred to as the "formation" process. Formation may occur prior to sealing or after sealing the lid to the container 104.

The illustrations, descriptions and methods provided herein disclose and/or are relevant to automotive applications, wherein for example groups of plates are used in each of six stacks for producing a standard automotive 12-volt battery, or a secondary absorbent glass mat (AGM) battery. However, the battery described is for purposes of example only, and it will be obvious to those skilled in the art after reading this specification that the size and number of the individual grids, the size and number of plates in any particular stack, and the number of stacks used to construct the battery may vary widely depending upon the desired end use.

A battery, including for example a lead-acid battery or more specifically a secondary absorbent glass mat (AGM) battery, or the like, includes any one or more advantageous features. For instance, the battery described herein has or includes a container and/or cover that individually or collectively defines or includes one or more features allowing the head space of each cell to communicate with one or more head spaces of other cells. The container and/or cover individually or collectively optimize or improve the use of the head space of the battery. The container includes or defines at least partially extended intercell partition walls that allow the battery to include grids or plates of extended or optimized height. The cover likewise includes or defines at least partially recessed intercell partition walls that allow the battery to include grids or plates of extended or optimized height. The use of the extended partition portions permits taller plates to be used, allowing more flexibility in the battery design.

The extended partition portions also permit the use of "tombstone" variety cast-on-straps without having to utilize shorter plates. Additionally, the container includes or defines at least partially extended intercell partition walls and/or a cover that includes or defines at least partially recessed intercell partition walls that individually or collectively allow the battery to include one or more cast-on straps and/or intercell welds (e.g., of the "tombstone" variety). The container which includes or defines at least partially extended intercell partition walls and/or the cover that includes or defines at least partially recessed intercell partition walls also individually or collectively allow the battery to include one or more cast-on straps and/or intercell welds using standard battery weld equipment.

In one or more particular examples of embodiments, the container and cover provided herein advantageously provide a battery having better performance as a taller grid may be used inside, for example, a traditional DIN specification battery. Moreover, the intercell partition walls described herein in association with the container and cover allow a battery to include or utilize different grids in the same specification battery, such as for example, using a taller grid than traditionally permitted and/or optimizing a new grid for such a container/cover. In this regard, a manufacturer also is provided the option and ability to use grids originally designed for other battery applications in a new environment.

As utilized herein, the terms "approximately," "about," "substantially," and similar terms, are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). The order or sequence of any process or method steps may be varied or re-sequenced according to alternative embodiments. Other substitutions, modifications, changes, and omissions may be made in the design, operating conditions, and arrangement of the various examples of embodiments without departing from the spirit or scope of the present inventions.

While this invention has been described in conjunction with the examples of embodiments outlined above, various alternatives, modifications, variations, improvements, and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements, and/or substantial equivalents.

The invention claimed is:

1. A container for a battery comprising:
   first and second side walls coupled to end walls and a base forming a recess, the side walls and end walls each having an edge;
   a plurality of first intercell partition walls and a plurality of second intercell partition walls in the recess, each having an extended segment which extends above the edge of any one or more of the first side wall, second side wall, and end walls, each extended segment having a length, more than one height, and a plurality of angled edge sections, wherein an intercell partition wall from the plurality of first intercell partition walls includes an extended segment which has a different length, number of heights, or angled edge sections than the extended segment of an intercell partition wall from the plurality of second intercell partition walls.

2. The container of claim 1, wherein at least one first intercell partition wall from the plurality of first intercell partition wall is adjacent an end wall.

3. The container of claim 1, wherein each extended segment is arranged such that at least a portion of the extended segment extends beyond a cast-on-strap of a plate assembly received within the container and to provide clearance between the cast-on-strap and a cover.

4. The container of claim 1, further comprising a cover having an intercell partition wall with a recessed area which accommodates and is aligned with an extended segment of an intercell partition wall from the plurality of first intercell partition walls or plurality of second intercell partition walls of the container.

5. The container of claim 4, wherein the cover has a plurality of intercell partition walls with a recessed area which accommodate the plurality of first intercell partition walls and the plurality of second intercell partition walls of the container.

6. The container of claim 1, wherein one or more of the plurality of first intercell partition walls has a segment arranged to accommodate a battery terminal.

7. The container of claim 1, wherein the extended segment of one or more of the plurality of second intercell partition walls has a recess arranged to accommodate a cover vent cap.

8. The container of claim 1, further comprising a cover having an intercell partition wall with a recessed area which is coupled in its entirety to the extended segment of an intercell partition wall from the plurality of first intercell partition walls or the plurality of second intercell partition walls of the container by a heat seal.

9. The container of claim 1, further comprising a cover having an intercell partition wall with a recessed area which is partially coupled to the extended segment of an intercell partition wall from the plurality of first intercell partition walls or the plurality of second intercell partition walls of the container by a heat seal and includes an area of clearance between the intercell partition wall of the container and the intercell partition wall of the cover.

10. The container of claim 1, further comprising a cover having an intercell partition wall with a recessed area which is partially coupled to the extended segment of an intercell partition wall from the plurality of first intercell partition walls or the plurality of second intercell partition walls of the container by a heat seal at edge portions adjacent the side walls of the container and includes an area of clearance defined between the intercell partition wall of the container, the intercell partition wall of the cover, and the edge portions.

11. The container of claim 1, wherein the battery is a lead-acid battery.

12. A battery having the container of claim 1.

13. A container for a battery comprising:
   first and second side walls coupled to end walls and a base forming a recess, the side walls and end walls each having an edge;
   a plurality of first container intercell partition walls and a plurality of second container intercell partition walls provided in the recess, each having an extended segment which extends above the edge of any one or more of the first side wall, second side wall, and end walls, the extended segment having a length and one or more sides having angled edge sections, and wherein an extended segment of a second intercell partition wall from the plurality of second container intercell partition walls has a recessed portion and a different angled edge section or length than an extended segment of a first intercell partition wall from the plurality of first container intercell partition walls; and
   a cover having a cover intercell partition wall with a recessed area which accommodates the extended segment of the second intercell partition wall or the first intercell partition wall and is coupled to the said second intercell partition wall or first intercell partition wall by a heat seal.

14. The container of claim 13, wherein the cover intercell partition wall is coupled to the said second intercell partition wall or first intercell partition wall in its entirety.

15. The container of claim 13, wherein the cover intercell partition wall and the said second intercell partition wall or first intercell partition wall are partially coupled, and an area of clearance between the said intercell partition walls.

16. The container of claim 13, wherein said second intercell partition wall or first intercell partition wall of the container and the cover intercell partition wall are partially coupled at edge portions adjacent the side walls of the container, and an area of clearance is provided which is defined between the intercell partition wall of the container, the intercell partition wall of the cover, and the edge portions.

17. The container of claim 1, further comprising capture elements provided on one or both sides of one or more of the plurality of first intercell partition walls or second intercell partition walls.

18. The container of claim 1, wherein at least one first intercell partition wall from the plurality of intercell partition walls has an extended segment which extends a length which is less than a total length of the at least one first intercell partition wall.

19. A method of assembling a battery container comprising:
forming a container having first and second side walls coupled to end walls and a base forming a recess, the side walls and end walls each having an edge, and forming a first container intercell partition wall and a second container intercell partition wall in the recess, each intercell partition wall having an extended segment which extends above the edge of any one or more of the first side wall, second side wall, and end walls, the first and second container intercell partition walls forming a-compartments in the container, and the extended segment of the second partition wall having an angled edge section or a length that is different from an angled edge section or a length of the first container intercell partition wall; and
coupling a cover to the container by heat sealing a cover intercell partition wall having a recessed area to the extended segment of the first container intercell partition wall or the second container intercell partition wall.

20. The container of claim 13 wherein fill tubes are configured to align with the recessed portion of the extended segment of the intercell partition walls.

21. The container of claim 13 wherein an area of clearance is provided between the recessed portion of the extended segment of the intercell partition walls and the cover.

\* \* \* \* \*

UNITED STATES PATENT AND TRADEMARK OFFICE
CERTIFICATE OF CORRECTION

PATENT NO.        : 8,993,151 B2
APPLICATION NO.   : 13/644417
DATED             : March 31, 2015
INVENTOR(S)       : Mack Page 1 of 1

It is certified that error appears in the above-identified patent and that said Letters Patent is hereby corrected as shown below:

Claims

In Column 13, Line 64, in Claim 2, delete "an" and insert -- to an --, therefor.

In Column 16, Line 12, in Claim 19, delete "a-compartments" and insert -- compartments --, therefor.

Signed and Sealed this
Sixth Day of October, 2015

Michelle K. Lee
*Director of the United States Patent and Trademark Office*